(12) United States Patent
Shiratori et al.

(10) Patent No.: US 12,209,298 B2
(45) Date of Patent: Jan. 28, 2025

(54) Ni—Cr—Mo-BASED ALLOY MEMBER, Ni—Cr—Mo-BASED ALLOY POWDER, AND COMPOSITE MEMBER

(71) Applicant: Hitachi Metals, Ltd., Tokyo (JP)

(72) Inventors: Hiroshi Shiratori, Tokyo (JP); Kazuya Shinagawa, Tokyo (JP); Shuho Koseki, Tokyo (JP); Kousuke Kuwabara, Tokyo (JP); Yasuhiko Otsubo, Tokyo (JP)

(73) Assignee: Proterial, Ltd., Tokyo (JP)

( * ) Notice: Subject to any disclaimer, the term of this patent is extended or adjusted under 35 U.S.C. 154(b) by 244 days.

(21) Appl. No.: 17/765,598

(22) PCT Filed: Mar. 31, 2021

(86) PCT No.: PCT/JP2021/013847
§ 371 (c)(1),
(2) Date: Mar. 31, 2022

(87) PCT Pub. No.: WO2021/201106
PCT Pub. Date: Oct. 7, 2021

(65) Prior Publication Data
US 2022/0341008 A1 Oct. 27, 2022

(30) Foreign Application Priority Data
Mar. 31, 2020 (JP) .................... 2020-062211

(51) Int. Cl.
*C22C 30/00* (2006.01)
*B22F 1/00* (2022.01)
(Continued)

(52) U.S. Cl.
CPC ............... *C22C 30/00* (2013.01); *B22F 1/00* (2013.01); *B33Y 70/00* (2014.12); *B33Y 80/00* (2014.12); *C22C 19/055* (2013.01)

(58) Field of Classification Search
None
See application file for complete search history.

(56) References Cited

U.S. PATENT DOCUMENTS

2016/0333444 A1 11/2016 Sugahara
2020/0206816 A1 7/2020 Daigo et al.

FOREIGN PATENT DOCUMENTS

JP 6-240401 A 8/1994
JP 8-134570 A 5/1996
(Continued)

OTHER PUBLICATIONS

Sawada—JP 2014-221940 A—PCT D2—MT—Ni-based boride-dispersed alloy—2014 (Year: 2014).*
(Continued)

*Primary Examiner* — John Vincent Lawler
(74) *Attorney, Agent, or Firm* — Crowell & Moring LLP

(57) ABSTRACT

Provided are a Ni—Cr—Mo-based alloy, a Ni—Cr—Mo-based alloy powder, a Ni—Cr—Mo-based alloy member, and a member that can be melted and solidified and have excellent corrosion resistance, wear resistance, and crack resistance. A Ni—Cr—Mo-based alloy member according to the present invention includes, by mass %, Cr: 18% to 22%, Mo: 18% to 39%, Ta: 1.5% to 2.5%, B: 1.0% to 2.5%, and a remainder consisting of Ni and unavoidable impurities, where $25 \leq Cr+(Mo/2B) < 38$ is satisfied, in which boride particles with a maximum particle size of 70 μm or less are dispersed and precipitated in a parent phase.

12 Claims, 9 Drawing Sheets

(51) Int. Cl.
  *B33Y 70/00* (2020.01)
  *B33Y 80/00* (2015.01)
  *C22C 19/05* (2006.01)

(56) References Cited

FOREIGN PATENT DOCUMENTS

| | | | | |
|---|---|---|---|---|
| JP | 2014221940 A | * | 11/2014 | ............ C22C 19/05 |
| JP | 2015-160965 A | | 9/2015 | |
| JP | 2019049015 A | * | 3/2019 | ................ B22F 1/05 |
| WO | WO 2019/049594 A1 | | 3/2019 | |

OTHER PUBLICATIONS

Oki—JP 2019-049015 A—MT—powder form of Ni-based alloy for addit.manuf.—Mar. 28, 2019 (Year: 2019).*

International Search Report (PCT/ISA/210) issued in PCT Application No. PCT/JP2021/013847 dated May 25, 2021 with English translation (four (4) pages).

Japanese-language Written Opinion (PCT/ISA/237) issued in PCT Application No. PCT/JP2021/013847 dated May 25, 2021 (three (3) pages).

* cited by examiner

[FIG. 1]
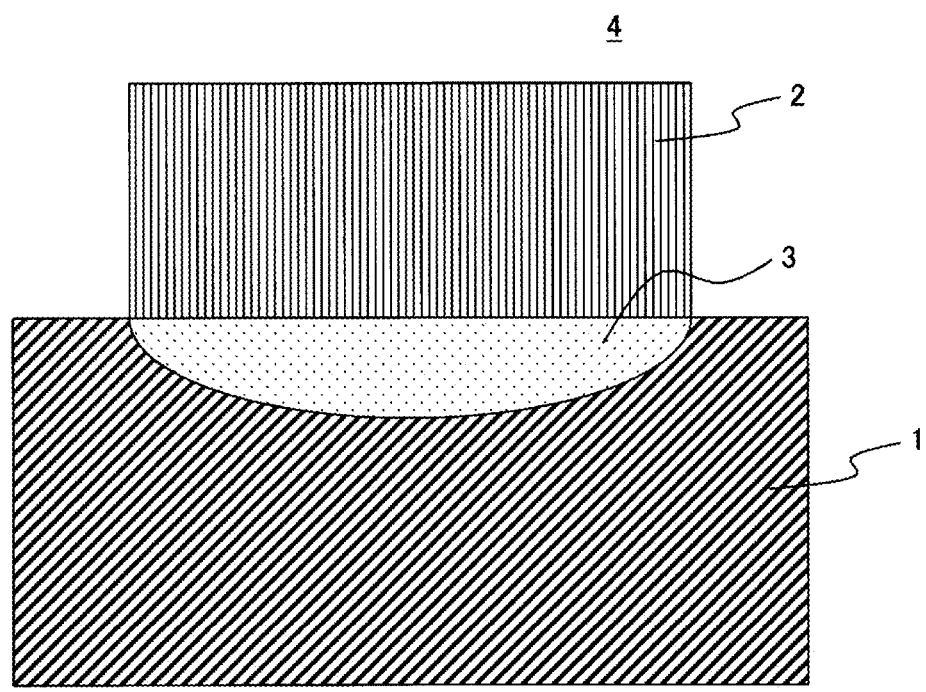

[FIG. 2A]
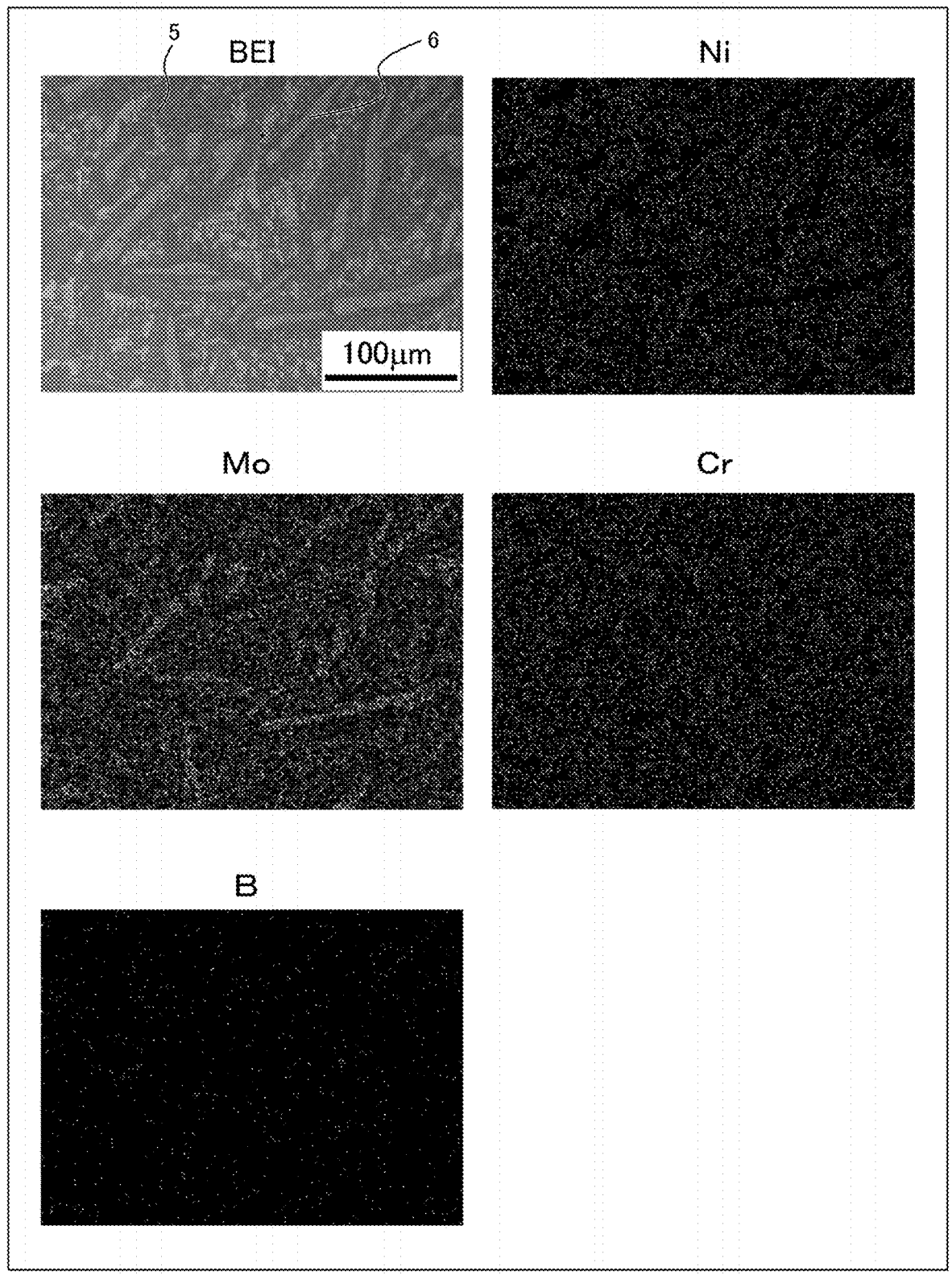

[FIG. 2B]
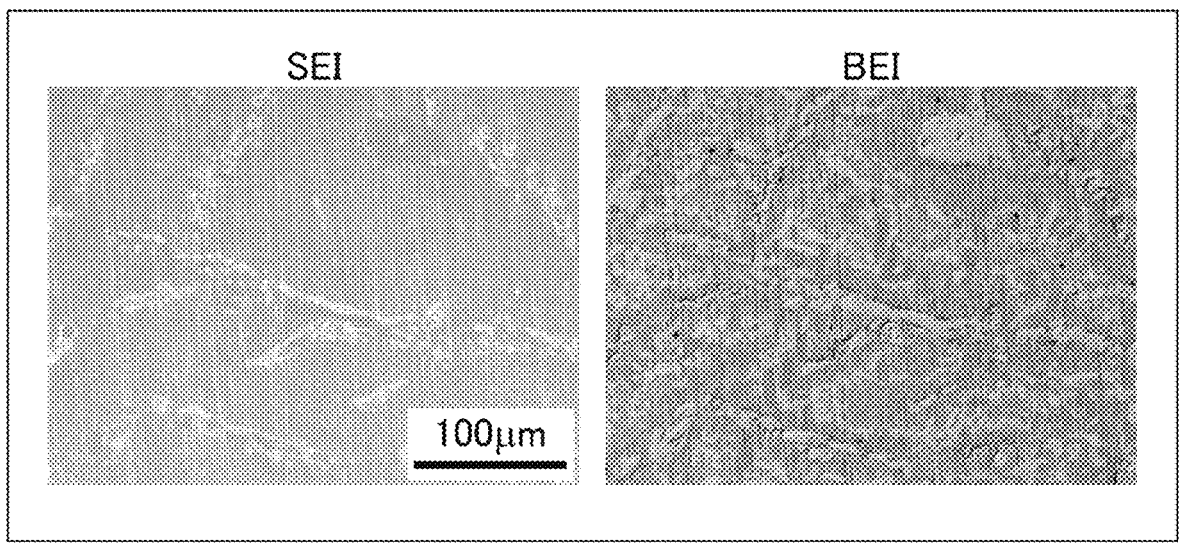

[FIG. 3A]
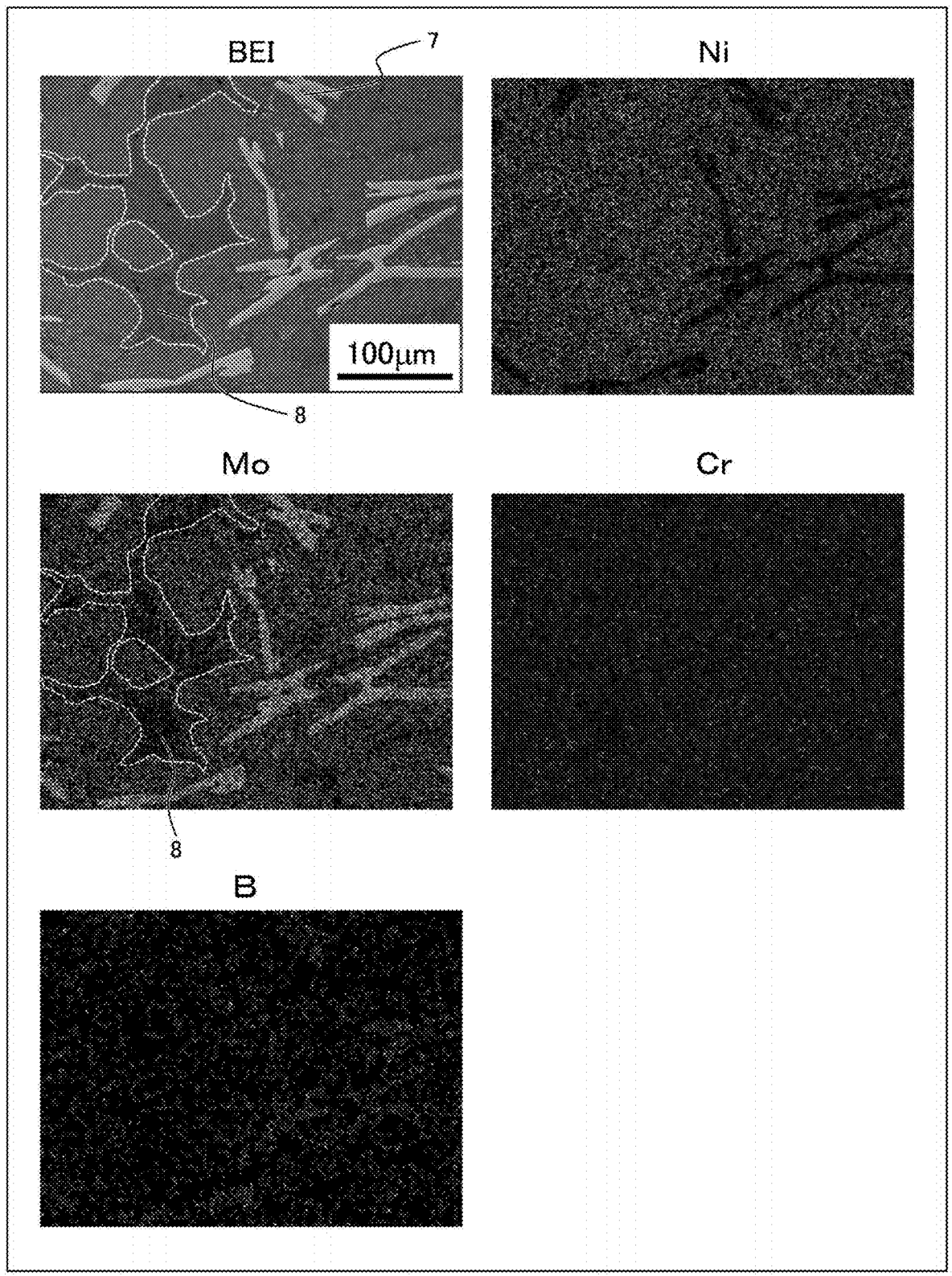

[FIG. 3B]
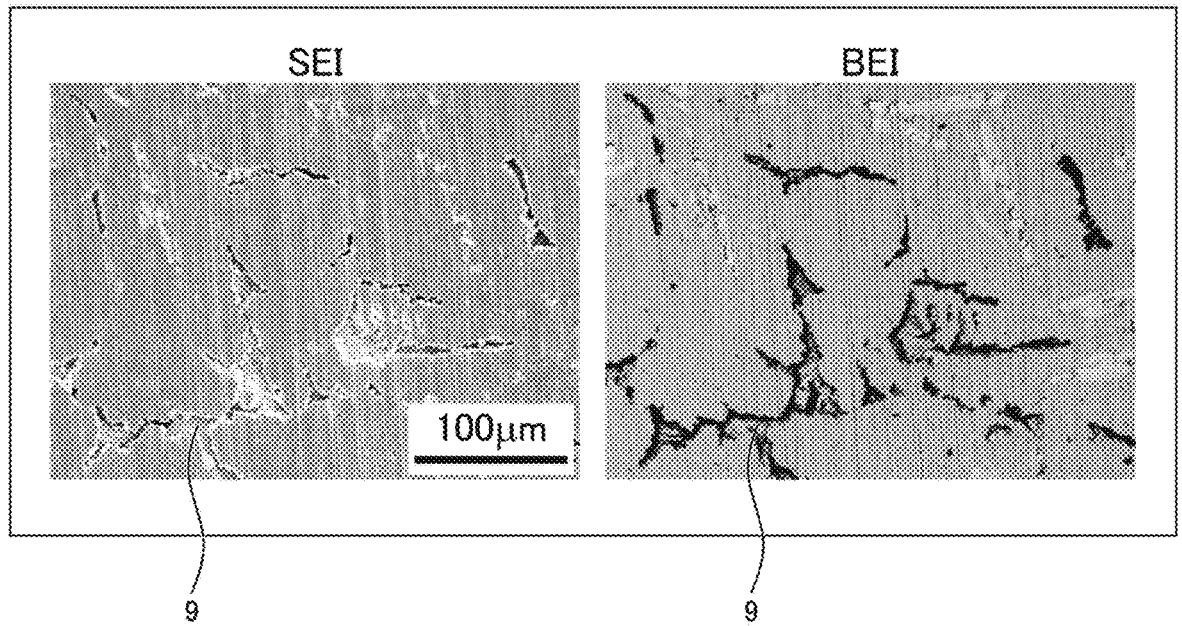
[FIG. 4]
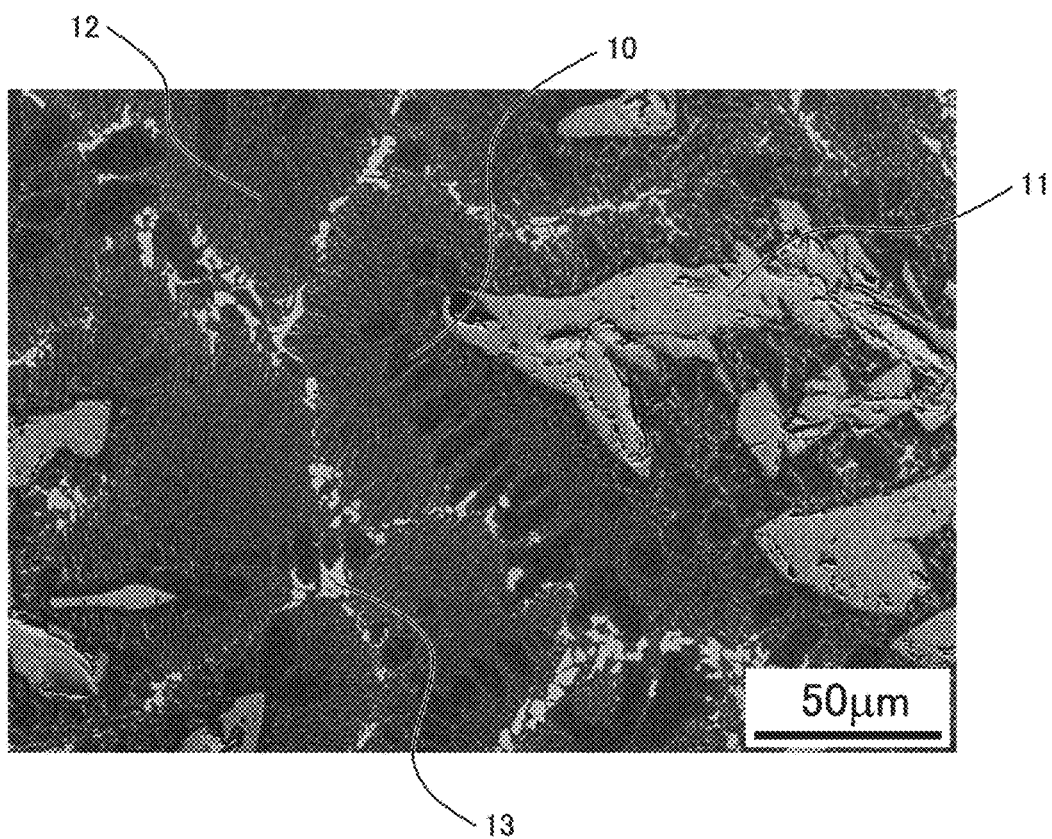

[FIG. 5]
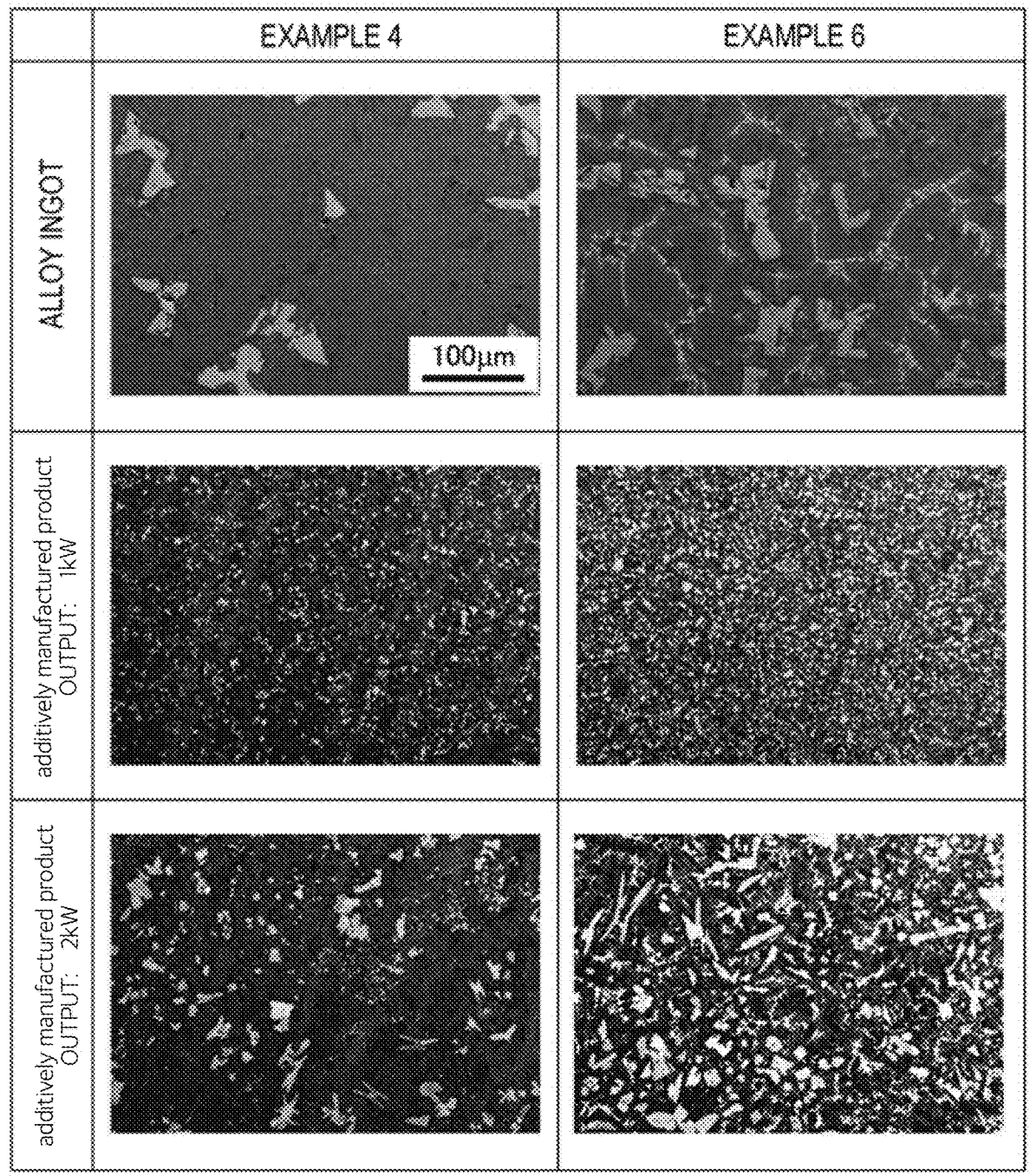

[FIG. 6]
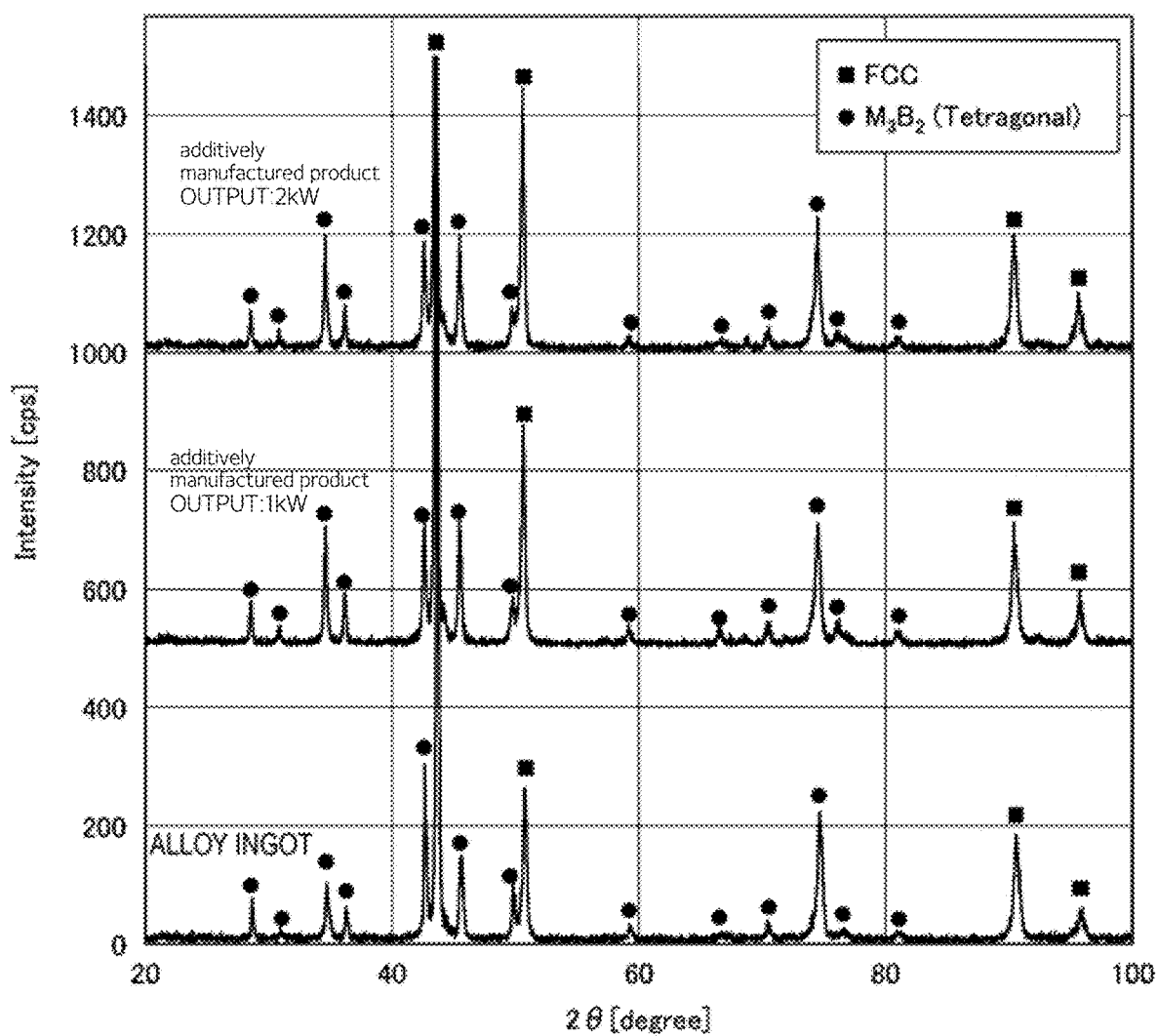

[FIG. 7]
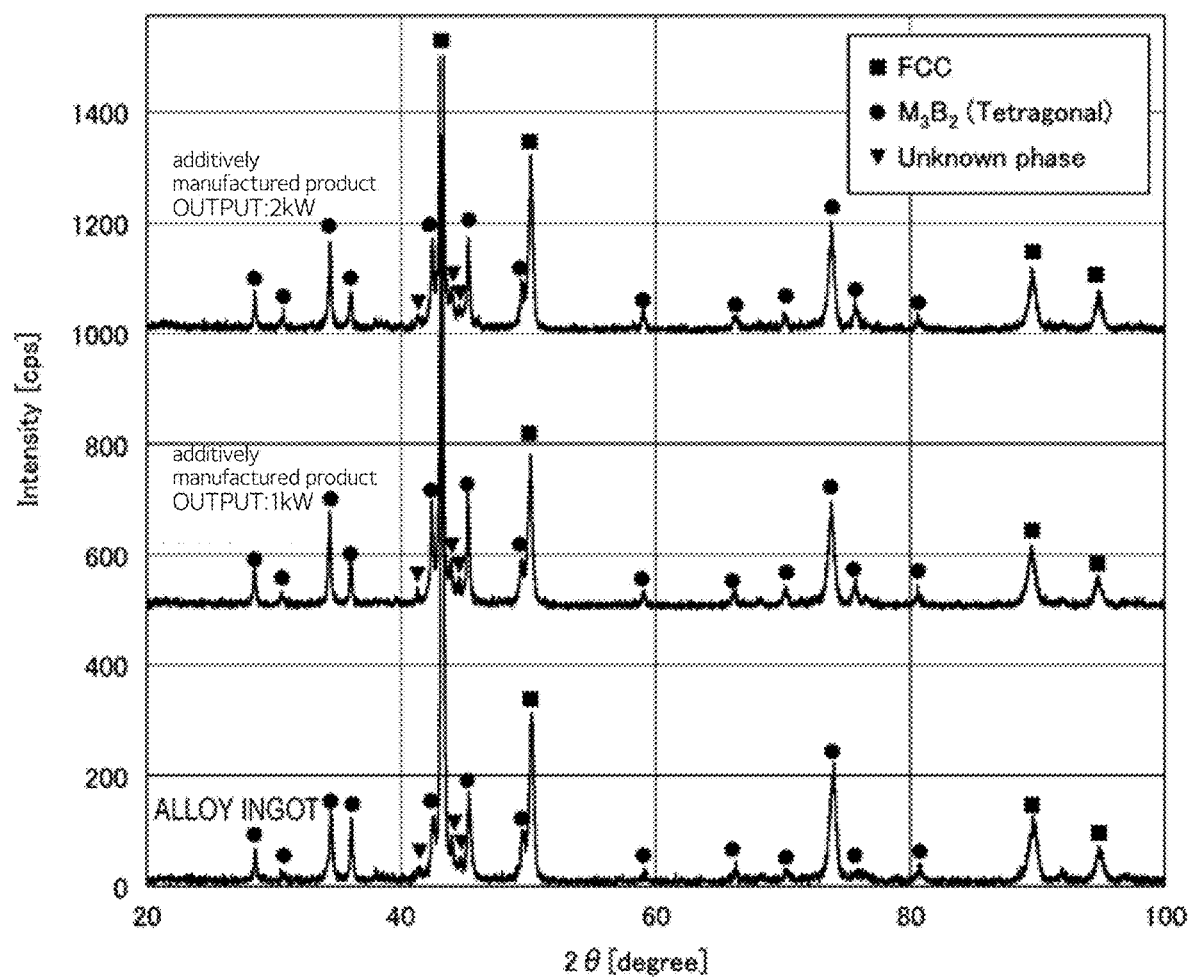

[FIG. 8]
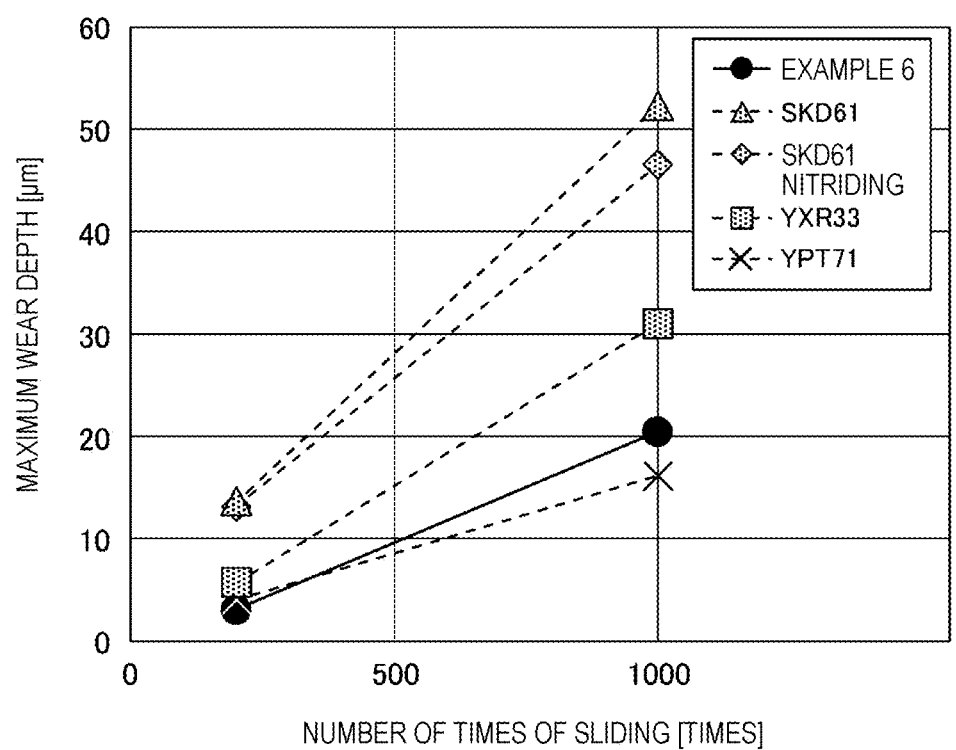

Ni—Cr—Mo-BASED ALLOY MEMBER, Ni—Cr—Mo-BASED ALLOY POWDER, AND COMPOSITE MEMBER

TECHNICAL FIELD

The present invention relates to a Ni—Cr—Mo-based alloy member, a Ni—Cr—Mo-based alloy powder, and a composite member having excellent corrosion resistance and wear resistance.

BACKGROUND ART

An injection molding machine is provided with a screw that injects a molten resin into a mold while kneading the molten resin in a cylinder where the resin is put in, heated, and melted. A corrosive gas such as sulfide gas may be generated when the resin is melted, and thus the screw and the cylinder for injection molding are required to have corrosion resistance to withstand the corrosive gas. In addition, glass fiber, carbon fiber, or the like are added to resin during fiber-reinforced plastic molding, and thus wear resistance, that is, hardness is also required.

In the related art, a Ni-based alloy (Ni—Cr—Mo-based alloy) in which the amount of Ni is highest and the amount of Cr and the amount of Mo are second-highest in terms of mass ratio is known as a high-hardness alloy having excellent corrosion resistance. Described in JP-A-2015-160965 (PTL 1) is a Ni-based alloy containing more than 18% by mass to less than 21% by mass of Cr, more than 18% by mass to less than 21% by mass of Mo, and Ta, Mg, N, Mn, Si, Fe, Co, Al, Ti, V, Nb, B, and Zr and having excellent hot forgeability and corrosion resistance.

The hardness of this Ni-based alloy is not disclosed in PTL 1. According to the investigation conducted by the present inventors, it is confirmed that the hardness of the Cr- and Mo-added Ni-based alloy is approximately HRC 20 to 30. At this hardness level, wear resistance is insufficient for use in screws and cylinders for injection molding.

In general, the wear resistance of a metal material increases when hard particles are dispersed in a crystal structure. JP-A-2014-221940 (PTL 2) discloses a Ni-based boride-dispersed corrosion- and wear-resistant alloy in which a hard phase mainly composed of boride is dispersed in a Cr- and Mo-added Ni-based alloy. In addition, JP-A-8-134570 (PTL 3) discloses a highly corrosion- and wear-resistant composite material in which a hard phase mainly composed of carbide, boride, and optional nitride, is dispersed in a Ni-based matrix.

CITATION LIST

Patent Literature

PTL 1: JP-A-2015-160965
PTL 2: JP-A-2014-221940
PTL 3: JP-A-8-134570

SUMMARY OF INVENTION

Technical Problem

The wear resistance of a Ni—Cr—Mo-based alloy can be improved by boride or carbide dispersion method as described in PTL 2 and PTL 3. However, an excessive amount of boride or carbide leads to a decline in corrosion resistance attributable to Cr intergranular segregation or local battery formation. In addition, an excessive increase in hardness and brittleness arises depending on the amount or form of dispersion.

In order to obtain a Ni—Cr—Mo-based alloy with excellent corrosion resistance and wear resistance, it is necessary to optimize the addition amount and addition ratio of each element with element distribution taken into account and it is required to achieve a balance between corrosion resistance and wear resistance without breaking the balance. When the hardness of a Ni-based alloy is low, an insufficient wear resistance arises regarding use as a screw or cylinder for injection molding. Accordingly, further hardness enhancement is desired regarding such alloys.

In addition, the Ni-based alloy of the related art in which boride or carbide is dispersed is often machined and molded by a sintering method or a hot isostatic press (HIP) method. However, the sintering method and the HIP method are manufacturing methods having a low degree of freedom in terms of workpiece shape. In a case where the sintering method or the HIP method is used, it is difficult to manufacture a product with a complex shape and product applications are limited. Accordingly, a more practical manufacturing method is required.

A casting method and an additive manufacturing (AM) method are metal material machining and molding methods other than the sintering method and the HIP method. These manufacturing methods have a high degree of freedom in terms of workpiece shape and thus are suitable for manufacturing objects complex in shape. However, the casting method and the additive manufacturing method entail metal material melting and solidification (hereinafter, referred to as melting and solidification in some cases). When these manufacturing methods are used for dispersion-reinforced Ni-based alloys, large thermal stress is generated during melting and solidification and cracking is likely to occur.

In general, in the additive manufacturing method, local melting and solidification are repeated with respect to metal powder, and thus the problem arises that cracking attributable to thermal stress cannot be ignored. Required under such circumstances is a Ni—Cr—Mo-based alloy that can be used in a manufacturing process entailing melting and solidification, has excellent corrosion resistance, and has excellent wear resistance and crack resistance.

In this regard, an object of the present invention is to provide a Ni—Cr—Mo-based alloy member having excellent corrosion resistance, wear resistance, and crack resistance as an additive manufacturing method-based additively manufactured product, a Ni—Cr—Mo-based alloy powder suitable for an additive manufacturing method, and a composite member.

Solution to Problem

The present inventor has studied the optimization of the component amount and component ratio of each element in order to obtain an alloy member having excellent crack resistance even in a case where a Ta- and B-added Ni—Cr—Mo-based alloy is fabricated by an additive manufacturing method. As a result, the present inventor has found that a Ni—Cr—Mo-based alloy member having excellent corrosion resistance, wear resistance, and crack resistance can be obtained by optimizing the component amount of each element and the ratios of Cr and Mo to B and dispersing and precipitating boride in the parent phase of a additively manufactured product.

In other words, a Ni—Cr—Mo-based alloy member of the present invention which is a additively manufactured product, includes, by mass %, Cr: 18% to 22%, Mo: 18% to 39%, Ta: 1.5% to 2.5%, and B: 1.0% to 2.5%, and a remainder consisting of Ni and unavoidable impurities, where 25≤Cr+(Mo/2B)<38 is satisfied, in which boride particles with a maximum particle size of 70 μm or less are dispersed and precipitated in a parent phase.

A Ni—Cr—Mo-based alloy powder of the present invention which is used for lamination building, includes, by mass %, Cr: 18% to 22%, Mo: 18% to 39%, Ta: 1.5% to 2.5%, B: 1.0% to 2.5%, and a remainder consisting of Ni and unavoidable impurities, where Cr+(Mo/2B)≥25 is satisfied.

In addition, one aspect of a composite member of the present invention includes a Ni—Cr—Mo-based alloy member.

Advantageous Effects of Invention

According to the present invention, it is possible to provide a Ni—Cr—Mo-based alloy member having excellent corrosion resistance and wear resistance, a Ni—Cr—Mo-based alloy powder having excellent corrosion resistance and wear resistance, having crack resistance, and suitable for an additive manufacturing method, and a composite member.

Issues, configurations, and effects other than those described above will be clarified by the following description of an embodiment.

BRIEF DESCRIPTION OF DRAWINGS

FIG. 1 is a schematic cross-sectional view illustrating an example of a composite member including a Ni—Cr—Mo-based alloy member of the present invention.

FIG. 2A is a photograph showing a backscattered electron image (BEI) of a pre-corrosion metallographic structure of Example 7 and a composition mapping result.

FIG. 2B is a secondary electron image (SEI) and a backscattered electron image of a post-corrosion metallographic structure of Example 7.

FIG. 3A is a photograph showing a backscattered electron image of a pre-corrosion metallographic structure of Comparative Example 2 and a composition mapping result.

FIG. 3B is a secondary electron image and a backscattered electron image of a post-corrosion metallographic structure of Comparative Example 2.

FIG. 4 is a backscattered electron image of a metallographic structure of Example 6.

FIG. 5 is a backscattered electron image of metallographic structures of alloy ingots of Examples 4 and 6 and metallographic structures in the case of additively manufactured products (1 kW and 2 kW in output).

FIG. 6 is a diagram illustrating the results of crystal structure analysis by XRD in the case of the alloy ingot of Example 4 and the additively manufactured products (1 kW and 2 kW in output).

FIG. 7 is a diagram illustrating the results of crystal structure analysis by XRD in the case of the alloy ingot of Example 6 and the additively manufactured products (1 kW and 2 kW in output).

FIG. 8 is a graph illustrating the result of a high-temperature wear test of Example 7.

DESCRIPTION OF EMBODIMENTS

Hereinafter, an embodiment of the present invention will be described. First, a Ni—Cr—Mo-based alloy will be described. Then, a Ni—Cr—Mo-based alloy powder, an additive manufacturing method, and a solidification structure will be described.

It should be noted that % indicating the amount of a metal element in the present specification means % by mass. In addition, a numerical range represented by using "to" means that the numerical values in front of and behind "to" are included as lower and upper limit values. In addition, the lower and upper limit values in front of and behind "to" can be combined in any manner.

[Ni—Cr—Mo-Based Alloy]

The Ni—Cr—Mo-based alloy in the present embodiment is a Ni-based alloy in which the amount of Ni is highest and the amount of Cr and the amount of Mo are second-highest in terms of mass ratio, Cr, Mo, and Ni are main constituent elements, and Ta and B are sub-constituent elements. As for the main constituent elements, the Ni content is highest, the Cr content is preferably in the range of 18% to 22% by mass, and the Mo content is preferably in the range of 18% to 39% by mass. As for Ta and B as sub-constituent elements, the Ta content is preferably in the range of 1.5% to 2.5% by mass and the B content is preferably in the range of 1.0% to 2.5% by mass. The Ni content is specified as the remainder with respect to Cr, Mo, Ta, and B.

Hereinafter, the Ni—Cr—Mo-based alloy will be described in detail as to each chemical component and content.

(Cr: 18% to 22%)

Cr has the effect of corrosion resistance improvement. In particular, corrosion resistance to nitric acid, sulfuric acid, and the like can be obtained as a result of passivation film formation. When the amount of Cr is less than 18%, the corrosion resistance improvement effect cannot be obtained. When the amount of Cr exceeds 22%, an intermetallic compound such as a coarse μ phase (such as $Ni_7Mo_6$) or a P phase (such as $Mo_3$ $(Mo,Cr)_5Ni_6$) is formed in combination with, for example, Mo, resulting in a decline in corrosion resistance and crack resistance. Accordingly, the amount of Cr is set to 18% to 22%. The lower limit of the amount of Cr is preferably 18.5% and more preferably 19% from the viewpoint of, for example, corrosion resistance improvement. The upper limit of the amount of Cr is preferably 21% and more preferably 20% from the viewpoint of, for example, suppressing intermetallic compound formation.

(Mo: 18% to 39%)

Mo has the effect of corrosion resistance improvement. In particular, the passivation film is finely strengthened in combination with Cr and excellent corrosion resistance to hydrochloric acid, sulfuric acid, fluoric acid, and so on can be obtained. When the amount of Mo is less than 18%, the corrosion resistance improvement effect of Mo cannot be sufficiently obtained in combination with Cr. When the amount of Mo exceeds 39%, the amount of boride increases in proportion to the Mo content and an intermetallic compound is formed, resulting in a significant decline in toughness. In a case where the alloy powder is used in the additive manufacturing method, the additively manufactured product is easy to crack and it is difficult to perform building appropriately. In addition, Mo is easily oxidized at a high temperature, and thus an oxide film is easily formed on the surface of the alloy powder in a case where the alloy powder is manufactured by a gas atomization method or the like. When the powder particles on which the oxide film is formed are used in the additive manufacturing method, a smoke phenomenon in which the powder soars during the lamination building occurs or the powder is mixed into the additively manufactured product as an impurity. Accordingly, the amount of Mo is set to 18% to 39%. The lower limit of the amount of Mo is preferably 20% and more preferably 24% from the viewpoint of, for example, corrosion resistance improvement. The upper limit of the amount of Mo is preferably 35% and more preferably 30% from the viewpoint of, for example, improving crack resistance and building properties.

(Ta: 1.5% to 2.5%)

Ta has the effect of remarkably strengthening the passivation film composed of Cr and Mo. Although adding 1.5% or more of Ta has the effect of improving corrosion resistance to acid, the corrosion resistance improvement effect is small even if the addition amount is increased by a certain amount or more. When the amount of Ta exceeds 2.5%, the amount of oxide formed on the powder surface during the powder manufacturing increases and, as a result, a defect in the additively manufactured product may become apparent. Accordingly, the amount of Ta is set to 1.5% to 2.5%. The lower limit of the amount of Ta is preferably 1.8% and more preferably 2.0% from the viewpoint of, for example, corrosion resistance improvement. In addition, the upper limit of the amount of Ta is preferably 2.3% and more preferably 2.1% from the viewpoint of, for example, the additively manufactured product defect.

(B: 1.0% to 2.5%)

B forms a boride and contributes to wear resistance improvement. Although adding 1.0% or more of B has the effect of wear resistance improvement, an increase in hardness occurs and cracking is likely to occur when B is added by more than 2.5%. Accordingly, the amount of B is set to 1.0% to 2.5%. The lower limit of the amount of B is preferably 1.2% and more preferably 1.4% from the viewpoint of, for example, corrosion resistance improvement. In addition, the upper limit of the amount of B is preferably 2.1% and more preferably 1.7% from the viewpoint of, for example, ensuring crack resistance.

$[25 \leq Cr+(Mo/2B) < 38]$

B addition leads to wear resistance improvement. Meanwhile, a boride mainly composed of Mo is formed, and thus the amount of Mo in the metal phase decreases and a decline in corrosion resistance to a non-oxidizing acid such as sulfuric acid occurs. In this regard, it is preferable to increase the amount of Mo addition as the amount of B addition increases. In addition, although Cr is unlikely to concentrate on boride during solidification and thus does not depend on the amount of B, a decrease in the amount of Cr leads to a decline in corrosion resistance to an oxidizing acid such as nitric acid. Accordingly, it is important that the Cr content and the Mo content are balanced and optimized with respect to the amount of B. Accordingly, Cr+(Mo/2B) as the mass ratio of Cr, Mo, and B is caused to satisfy 25 to 38. The value of Cr+(Mo/2B) being less than 25 leads to a decline in corrosion resistance, corrosion resistance to a non-oxidizing acid such as sulfuric acid in particular. The value of Cr+(Mo/2B) exceeding 38 leads to an increase in intermetallic compound amount and a significant reduction in toughness. The lower limit is preferably 26 and more preferably 27. In addition, the upper limit is preferably 34 and more preferably 30.

In the Ni—Cr—Mo-based alloy of the present embodiment, the following elements can be freely added mainly for the purpose of manufacturing improvement.

(Fe: 7.0% or Less)

Fe is higher in melting point than Ni and has the effect of increasing the viscosity of a molten metal. The metal powder used in the additive manufacturing method is usually manufactured by solidifying a molten metal that has become droplets by an atomization method or the like. Fe addition results in an increase in the amount of the solid phase in the process of solidification and an increase in molten metal viscosity, and thus controlling the particle size of the metal powder is facilitated. In addition, it is possible to suppress the generation of fine powder with a particle size of less than 5 μm, which is not suitable for the additive manufacturing method. When the amount of Fe is 0.01% or more, the effect of Fe increasing the viscosity of the molten metal can be obtained. When the amount of Fe exceeds 7.0%, the corrosion resistance of the parent phase to electrochemical corrosion declines. Accordingly, the amount of Fe is set to 0.01 to 7.0% in the case of active addition. The lower limit of the amount of Fe is preferably 0.05% and more preferably 0.10% in the case of active addition. The upper limit of the amount of Fe is preferably 5.5% and more preferably 1.0%.

(Co: 2.5% or Less)

Co is higher in melting point than Ni and has the effect of increasing the viscosity of a molten metal. When Co is added, controlling the particle size of the metal powder is facilitated as in the case of Fe addition. In addition, it is possible to suppress the generation of fine powder with a particle size of less than 5 μm, which is not suitable for the additive manufacturing method. When the amount of Co is 0.001% or more, the effect of Co increasing the viscosity of the molten metal can be obtained. When the amount of Co exceeds 2.5%, a micro-level shrinkage cavity is likely to arise in the solidified particles during the alloy powder manufacturing. Accordingly, the amount of Co is set to 0.001 to 2.5% in the case of active addition. The lower limit of the amount of Co is preferably 0.005% and more preferably 0.010% in the case of active addition. The upper limit of the amount of Co is preferably 1.0% and more preferably 0.5%.

(Si: 0.2% or Less)

Si is a chemical component added as a deoxidizing agent and has the effect of molten metal cleanliness enhancement. When the deoxidizing agent is added with the alloy powder used in the additive manufacturing method, the joints between the particles of the additively manufactured product become smooth, and thus defects are unlikely to arise in the additively manufactured product. When the amount of Si is 0.001% or more, the effect of Si addition can be obtained. When the amount of Si exceeds 0.2%, the intermetallic compound attributable to Si segregates at the grain boundaries, resulting in a decline in corrosion resistance. Accordingly, the amount of Si is set to 0.001 to 0.2% in the case of active addition. The lower limit of the amount of Si is preferably 0.002% and more preferably 0.005% in the case of active addition. The upper limit of the amount of Si is preferably 0.1% and more preferably 0.01%.

(Al: 0.5% or Less)

Al is a chemical component added as a deoxidizing agent and has the effect of molten metal cleanliness enhancement. When the amount of Al is 0.01% or more, the effect of Al addition can be obtained. When the amount of Al exceeds 0.5% with the alloy powder used in the additive manufacturing method, oxides are likely to be formed on the surfaces of the particles on the occasion of melting and solidification. When the powder on which the oxide film is formed is used in the additive manufacturing method, a problem such as a smoke phenomenon may arise during the lamination building or impurities may be mixed into the additively manufactured product. Accordingly, the amount of Al is set to 0.01 to 0.5% in the case of active addition. The lower limit of the amount of Al is preferably 0.03% and more preferably 0.05% in the case of active addition. The upper limit of the amount of Al is preferably 0.4% and more preferably 0.3%.
(Cu: 0.25% or Less)

Cu has the effect of improving the corrosion resistance of the parent phase to electrochemical corrosion. In particular, excellent corrosion resistance to a non-oxidizing acid such as hydrochloric acid and fluoric acid in a moist environment can be obtained. When the amount of Cu is 0.001% or more, the corrosion resistance improvement effect of Cu can be obtained. When the amount of Cu exceeds 0.25% with the alloy powder used in the additive manufacturing method, oxides are likely to be formed on the surfaces of the particles on the occasion of melting and solidification. When the powder on which the oxide film is formed is used in the additive manufacturing method, a problem such as a smoke phenomenon may arise during the lamination building or impurities may be mixed into the additively manufactured product. Accordingly, the amount of Cu is set to 0.001 to 0.25% in the case of active addition. The lower limit of the amount of Cu is preferably 0.002% and more preferably 0.005% in the case of active addition. The upper limit of the amount of Cu is preferably 0.1% and more preferably 0.01%.
(Unavoidable Impurities)

In the Ni—Cr—Mo-based alloy according to the present embodiment, the remainder with respect to the above main constituent and sub-constituent elements is composed of Ni and unavoidable impurities. The alloy according to the present embodiment is allowed to be mixed with impurities mixed in the raw materials and impurities brought in depending on the conditions of materials, manufacturing equipment, and so on. Specific examples of the unavoidable impurities include P, S, Sn, As, Pb, N, O, and so on. The unavoidable impurities content is preferably low and may be 0%.

The composition of the alloy described above can be analyzed by energy dispersive X-ray spectroscopy (EDX) or the like.

[Ni—Cr—Mo-Based Alloy Member]

A Ni—Cr—Mo-based alloy member according to the present embodiment is made of a additively manufactured product. The additively manufactured product can be manufactured using an alloy powder as a material and by the additive manufacturing method to be described later.

The use and shape of the Ni—Cr—Mo-based alloy member according to the present embodiment are not particularly limited. The alloy member according to the present embodiment can be subject to appropriate thermal refining such as heat treatment and aging treatment depending on, for example, the use as a member or required mechanical properties.

It should be noted that the entire alloy member may be built by the additive manufacturing method or only a part of the alloy member may be built by the additive manufacturing method when the Ni—Cr—Mo-based alloy member according to the present embodiment is manufactured as a additively manufactured product. In other words, the alloy member according to the present embodiment includes a composite member in which a powder overlay (metalizing) of the Ni—Cr—Mo-based alloy having the chemical composition described above is applied to the base material of the Ni—Cr—Mo-based alloy having the chemical composition described above. In the present invention, "Ni—Cr—Mo-based alloy member" excludes alloy ingots (cast bodies).

Specific examples of the Ni—Cr—Mo-based alloy member include members used for equipment and structures used for applications requiring corrosion resistance and wear resistance. Examples thereof include screws and cylinders for injection molding, valves, joints, heat exchangers, and pumps at oil well plant excavation equipment and chemical plants, turbines for generators, compressor impellers, and blades and disk members of aircraft engines.

[Ni—Cr—Mo-Based Alloy Powder]

The Ni—Cr—Mo-based alloy powder according to the present embodiment (hereinafter, also simply referred to as "alloy powder") can be a powder or granular material having an appropriate particle shape, an appropriate particle size, and an appropriate particle size distribution insofar as the alloy powder has the chemical composition described above. In addition, the alloy powder according to the present embodiment may be composed of only the particles of the Ni—Cr—Mo-based alloy having the chemical composition described above or may be a powder obtained by mixing particles of a Ni—Cr—Mo-based alloy having the chemical composition described above and particles having another chemical composition. In addition, the alloy powder may be a powder having the chemical composition described above by a set of particles having any chemical composition. The mixing may be of any form. For example, the Ni—Cr—Mo-based alloy powder of the present invention also includes a mixed powder in which respective metallic raw material powders are mixed in accordance with the alloy components and ratios described above and the granulated powder and atomized powder to be described later.

In addition, the Ni—Cr—Mo-based alloy powder according to the present embodiment may be manufactured by a mechanical manufacturing method such as mechanical pulverization and mechanical alloying or may be manufactured through a melting and solidification process such as an atomization method. In addition, the alloy powder may be manufactured by a chemical manufacturing method such as oxidation-reduction and electrolysis methods. From the viewpoint of using the alloy powder in the additive manufacturing method, it is preferable that the alloy powder is manufactured through a melting and solidification process in that spherical particles are formed with ease.

The Ni—Cr—Mo-based alloy powder according to the present embodiment can be a granulated powder or a sintered powder. The granulated powder is a powder that is granulated such that at least a part of the particles of the powder or granular material are bonded to each other. The sintered powder is a powder that is sintered by heat treatment such that at least a part of the particles of the powder or granular material are bonded to each other.

From the viewpoint of appropriately adjusting the particle size distribution of secondary particles, the sintered powder is preferably manufactured by firing a granulated powder after an alloy powder is temporarily turned into the granulated powder. For example, the following method can be used as a method for obtaining a granulated sintered powder by performing firing after turning a Ni—Cr—Mo-based alloy powder into a granulated powder.

Fine particles of MoB and fine particles of the above alloy component metal or alloy as examples are prepared as raw materials in accordance with the composition of the powder material to be manufactured. Here, as for the particle size of the fine particles of MoB, $d_{50}$, which is the average particle size at a time when the integrated value by laser diffraction-type particle size distribution measurement is 50% by volume, is, for example, preferably 5 μm or less and more preferably 0.1 to 1.0 μm.

$d_{50}$ is preferably 1.0 to 50.0 µm as for the particle size of the fine particles of the metal or alloy used as raw materials for Ni, Cr, Mo, and Ta. $d_{50}$ described above is, for example, preferably 0.1 to 1.0 µm as for the particle size of the additive material (e.g. binder used for the granulated powder).

The prepared raw material powder is wet-mixed together with the binder. It is preferable to use a hydrocarbon-based binder as the binder. Examples of the hydrocarbon-based binder include waxes such as paraffin. The mixture obtained as a result of the mixing is spray-dried using a spray dryer. The average particle size $d_{50}$ of the resultant granulated powder is 1.0 µm to 200 µm.

Next, the granulated powder of the mixture is dried and the binder is degreased. The degreasing temperature may be a temperature at which the employed binder is sufficiently removed within a required time. The degreasing temperature can be, for example, 400 to 600° C. Then, the granulated powder of the mixture is degreased and then continuously fired to sinter the particles together. The firing temperature is, for example, 1,000° C. or higher although the temperature depends on the chemical composition. When the firing temperature is a high temperature of 1,000° C. or higher, the density of the sintered body increases, and thus a high-bulk density sintered powder suitable for packing density improvement can be obtained.

The fired sintered powder can be, for example, naturally cooled by air cooling or the like and then classified by sieving classification, dry classification, wet classification, or the like depending on the purpose. When the classification is performed such that the average particle size $d_{50}$ is 20 to 100 µm, a Ni—Cr—Mo-based alloy powder having a highly uniform particle size suitable for the additive manufacturing method can be obtained.

Using the above method for turning a Ni—Cr—Mo-based alloy powder into a granulated powder and then firing the granulated powder to obtain a granulated sintered powder, the particles of the powder or granular material can be sufficiently bonded by sintering and the binder used for the granulation operation can be reliably removed from the powder or granular material. In general, when a degreased granulated powder is used as it is in a directed energy deposition-based additive manufacturing method, the granulated powder is easily crushed during supply to a building region. On the other hand, the particles are firmly bonded by sintering in the granulated sintered powder, and thus it is possible to eliminate pulverization during lamination building and reduce defects during melting and solidification and chemical composition non-uniformity attributable to oxidation and mixing of impurities.

The Ni—Cr—Mo-based alloy powder may be spheroidized before being used in the additive manufacturing method. A thermal plasma droplet refining (PDR) method, a high-temperature heat treatment, or the like can be used as the spheroidization treatment. The PDR method is a method for introducing powder into plasma and performing a high-temperature heat treatment. By the PDR method, a part or all of the particles of the powder or granular material are instantly melted and solidified, and thus particles close to a true sphere can be obtained by surface tension. The surface of the particles becomes smooth and the fluidity as a powder or granular material increases, and thus the building precision of the additively manufactured product can be improved. In addition, defects during melting and solidification and solidification structure-related defects attributable to chemical composition non-uniformity can be reduced.

In addition, the Ni—Cr—Mo-based alloy powder according to the present embodiment can be manufactured by various atomization methods. The atomization method is a method by which a molten metal is scattered as droplets by the kinetic energy of a medium sprayed at a high pressure, the molten metal that has become droplets is solidified, and a powder or granular material is made as a result. Any of a water atomization method, a gas atomization method, a jet atomization method, and the like can be used as the atomization method.

The water atomization method is a method by which high-pressure water as a spray medium is sprayed onto a molten metal that has flowed down from the bottom portion of a tundish or the like and a metal powder is made by the kinetic energy of the water. Particles made by the water atomization method are likely to be amorphous. This is because the water as the spray medium of the water atomization method cools fast as compared with other atomization methods. The particles made by the water atomization method have a strong tendency to be irregular in shape.

The gas atomization method is a method for making a metal powder by spraying a molten metal that has flowed down from the bottom portion of a tundish or the like with an inert gas such as high-pressure nitrogen and argon or high-pressure air as a spray medium. Particles made by the gas atomization method are likely to be spherical. This is because the inert gas or air as the spray medium of the gas atomization method cools slowly as compared with the water atomization method. The molten metal turned into droplets by the spray medium remains in a liquid state for a relatively long time, and thus it is conceivable that spheroidization attributable to surface tension progresses.

The jet atomization method is a method for making a metal powder by injecting a high-speed and high-temperature flame jet as a spray medium into a molten metal that has flowed down from the bottom portion of a tundish or the like. A supersonic combustion flame resulting from kerosene combustion or the like is used as the flame jet. Accordingly, the molten metal is accelerated for a relatively long time to become fine particles. The particles made by the jet atomization method are likely to be spherical and have a strong tendency to have a particle size distribution with a small average particle size.

The Ni—Cr—Mo-based alloy powder according to the present embodiment is preferably manufactured by the gas atomization method from the viewpoint of being used in the additive manufacturing method. The sphericity of the particles made by the gas atomization method is high, and the fluidity as a powder or granular material is also high. Accordingly, the building precision of the additively manufactured product can be improved. In addition, defects during melting and solidification and solidification structure-related defects attributable to chemical composition non-uniformity can be reduced.

The alloy powder manufacturing method described above is an example, and the alloy powder of the present invention can also be manufactured by another manufacturing method.

[Additive Manufacturing Method]

The Ni—Cr—Mo-based alloy powder according to the present embodiment can be used in an appropriate additive manufacturing method. In general, additive manufacturing methods for metal materials are roughly divided into powder bed fusion (PBF) and directed energy deposition (DED) methods.

By the powder bed fusion (PBF) method, a powder bed is formed by spreading a metal powder on a base material, the metal powder spread in a target region is irradiated with a beam, and the metal powder is built by melting and solidification. In the PBF method, three-dimensional lamination building in which powder bed lamination and metal powder melting and solidification are repeated is performed every time two-dimensional building is performed on the powder bed.

The powder bed fusion (PBF) method includes a method using a laser beam as a heat source and a method using an electron beam as a heat source. The method using a laser beam is roughly divided into a selective laser melting (SLM) method and a selective laser sintering (SLS) method. The method using an electron beam is called a selective electron beam melting (SEBM, or simply EBM) method.

The selective laser melting (SLM) method is a method for melting or sintering a metal powder with a laser beam. The selective laser sintering (SLS) method is a method for sintering a metal powder with a laser beam. In the SLM and SLS methods using a laser beam, the metal powder is melted and solidified in an inert atmosphere such as nitrogen gas.

The selective electron beam melting (SEBM/EBM) method is a method for melting a metal powder using an electron beam as a heat source. The EBM method using an electron beam is performed by irradiating a metal powder with an electron beam and melting the metal powder with kinetic energy converted into heat. In the EBM method, irradiation with an electron beam and metal powder melting and solidification are promoted under high vacuum.

By the directed energy deposition (DED) method, the metal powder is supplied and the beam irradiation is performed onto the base material or toward the already built building region and the metal powder supplied to the building region is built by melting and solidification. In the DED method, scanning with the supply of the metal powder and the beam irradiation two-dimensionally or three-dimensionally is performed, and three-dimensional lamination building is performed in which the solidified metal is repeatedly deposited with respect to the already built building region.

The DED method is also called a metal deposition method. The DED method includes a laser metal deposition (LMD) method in which a laser beam is used as a heat source and a method in which an electron beam is used as a heat source. A DED method for applying a powder overlay to a base material using a laser beam is also called laser powder overlay welding.

Of the various additive manufacturing methods, the powder bed fusion (PBF) method is advantageous in that the shape precision of the additively manufactured product is high. The directed energy deposition (DED) method is advantageous in that high-speed building is possible. In particular, as for the selective laser melting (SLM) method as one of the powder bed fusion (PBF) methods, selective metal powder melting and solidification are possible when a powder bed with a thickness of several tens of micrometers is irradiated with a laser having a very small beam diameter.

[Particle Size Distribution of Ni—Cr—Mo-Based Alloy Powder]

The Ni—Cr—Mo-based alloy powder according to the present embodiment preferably has a particle size range of 5 to 500 μm. In the additive manufacturing method, melting and solidification are promoted for each set of some powder. An excessively small alloy powder particle size results in a small bead, and thus defects such as interfacial fracture of the bead are likely to occur. An excessively large alloy powder particle size results in a large bead, and thus defects attributable to a non-uniform cooling rate are likely to occur.

A additively manufactured product with few defects is obtained with ease at a particle size that is within the range of 5 to 500 μm.

The optimum particle size and particle size distribution of the Ni—Cr—Mo-based alloy powder differ depending on the type of the additive manufacturing method. Accordingly, it is preferable to adjust the particle size and particle size distribution of the Ni—Cr—Mo-based alloy powder in accordance with the type of the additive manufacturing method. The particle size distribution of the Ni—Cr—Mo-based alloy powder according to the present embodiment is preferably within the range of 10 to 250 μm from the viewpoint of being used in the powder bed fusion (PBF) method.

For example, in the selective laser melting (SLM) method, the average particle size $d_{50}$ corresponding to a powder integration frequency of 50% by volume in the cumulative particle size distribution based on laser diffraction scattering-type particle size distribution measurement is preferably 10 to 60 μm and more preferably 20 to 40 μm. In addition, a particle size $d_{10}$ corresponding to an integration frequency of 10% by volume is preferably 5 to 35 μm. In addition, a particle size $d_{90}$ corresponding to an integration frequency of 90% by volume is preferably 20 to 100 μm.

In the SLM method, a metal powder particle size of less than 5 μm results in a decline in depositability and ductility as a powder or granular material, and thus the powder laminated as the powder bed is likely to be biased. In addition, at a particle size exceeding 150 μm, the melting caused by the beam is likely to be incomplete, which leads to a defect in the solidification structure or an increase in surface roughness. On the other hand, at the particle size described above, a flat powder bed with a uniform thickness is formed with ease and repeated powder bed lamination is also facilitated, and thus a additively manufactured product with few defects is obtained with ease.

In addition, in the laser metal deposition (LMD) method and the powder bed-type selective electron beam melting (EBM) method, the average particle size $d_{50}$ corresponding to a powder integration frequency of 50% by volume in the cumulative particle size distribution based on laser diffraction scattering-type particle size distribution measurement is preferably 30 to 250 μm and more preferably 60 to 120 μm. In addition, the particle size $d_{10}$ corresponding to an integration frequency of 10% by volume is preferably 15 to 100 μm. In addition, the particle size $d_{90}$ corresponding to an integration frequency of 90% by volume is preferably 50 to 500 μm.

In the LMD method, the flow of the powder conveyed to a nozzle head is likely to be biased at a small average particle size of the metal powder, which makes it difficult to stably supply the metal powder to a molten pool. In addition, at a particle size that exceeds approximately 500 μm, the metal powder may cause obstruction in, for example, the nozzle head, melting becomes incomplete, a defect in the solidification structure may arise, or an increase in surface roughness may arise. In the EBM method, the smoke phenomenon is likely to occur at a small average particle size of the metal powder. On the other hand, at the particle size described above, metal powder supply to a molten pool and the non-scattering property of the metal powder are satisfactory, and thus a highly precise additively manufactured product can be obtained with ease.

It should be noted that the particle size distribution and particle size can be measured using a laser diffraction scattering-type particle size distribution measuring device. The average particle size is obtained as a particle size corresponding to a volume of 50% integrated from the side with the small particle size, in an integrated distribution curve indicating the relationship between the volume integrated value obtained by integrating the volumes of the particles in the order from the particles with the small particle size to the particles with the large particle size, and the particle size at the volume integrated value.

[Composite Member Using Ni—Cr—Mo-Based Alloy]

A composite member using the Ni—Cr—Mo-based alloy according to the present embodiment is obtained by integrating another member with the Ni—Cr—Mo-based alloy member having the chemical composition described above or an alloy layer formed of the Ni—Cr—Mo-based alloy powder having the chemical composition described above. An appropriate method such as welding, soldering, brazing, mechanical joining, and diffusion joining can be used as a method for the integration.

FIG. 1 is a cross-sectional view schematically illustrating an example of a composite member including the Ni—Cr—Mo-based alloy member according to the present embodiment. Illustrated in FIG. 1 as an example of the composite member according to the present embodiment is a composite member in which a powder overlay (metalizing) of the Ni—Cr—Mo-based alloy having the chemical composition described above is applied to a base material different in material from the Ni—Cr—Mo-based alloy having the chemical composition described above.

A composite member 4 illustrated in FIG. 1 has a base material 1 different in material from the Ni—Cr—Mo-based alloy and an alloy layer 2 formed on the surface of the base material using the Ni—Cr—Mo-based alloy having the above chemical composition. The composite member 4 can be manufactured by the additive manufacturing method of directed energy deposition (DED) type using a Ni—Cr—Mo-based alloy powder.

The shape and material of the base material 1 are not particularly limited. A Fe-based alloy, a Ni-based alloy, and so on can be used as the base material 1. In addition, the shape, thickness, and so on of the alloy layer 2 are not limited. In FIG. 1, a layer resulting from a powder overlay partially applied to the surface of the base material 1 is formed as the alloy layer 2. In addition, surface treatment may be performed so that the alloy layer 2 formed on the surface of the base material 1 is resistant to heat, wear, and so on. Examples of the surface treatment include plating treatment, ceramic coating, nitriding treatment, and carburizing treatment. In addition, a additively manufactured product having a three-dimensional shape may be formed on the alloy layer 2.

In the related art, a composite member of a Ni—Cr—Mo-based alloy and a heterogeneous material is manufactured by a sintering method or an HIP method in many cases. However, the coefficient of linear expansion is usually different between the Ni—Cr—Mo-based alloy and the heterogeneous material, and thus the Ni—Cr—Mo-based alloy is likely to be peeled off in, for example, a post-sintering cooling process. On the other hand, the composite member 4 using the Ni—Cr—Mo-based alloy according to the present embodiment can be manufactured by the additive manufacturing method using the Ni—Cr—Mo-based alloy powder having the above chemical composition as a material.

In the Ni—Cr—Mo-based alloy powder used for manufacturing the composite member 4, a mixed layer 3 in which boron or the like is diffused is formed between the base material 1 and the alloy layer 2 in the process of alloy powder melting and solidification. The mixed layer 3 has an intermediate chemical composition between the base material 1 and the alloy layer 2 as a result of the diffusion of boron or the like during the melting and solidification. High adhesion can be ensured by the mixed layer 3 being formed. The composite member 4 is capable of exhibiting high wear resistance and crack resistance without deterioration of corrosion resistance even after the melting and solidification during the additive manufacturing.

As in the case of the Ni—Cr—Mo-based alloy member described above, specific examples of the composite member using the Ni—Cr—Mo-based alloy include members used for equipment and structures used for applications requiring corrosion resistance and wear resistance and examples thereof include screws and cylinders for injection molding, valves, joints, heat exchangers, and pumps at oil well plant excavation equipment and chemical plants, turbines for generators, and compressor impellers. In addition, a powder overlay-applied mold or the like can be mentioned as a mold repair. Specifically, it is possible to repair the mold and strengthen the surface by overlaying the surface of the mold.

[Solidification Structure of Ni—Cr—Mo-Based Alloy Member]

The solidification structure of the Ni—Cr—Mo-based alloy member of the present invention is mainly a metallographic structure having a metal phase having an FCC structure and a square $M_3B_2$ boride. Another intermetallic compound (e.g. P phase ($Mo_3$ $(Mo,Cr)_5Ni_6$)) is also crystallized depending on the amounts of Cr and Mo. The boride has two forms, one in which fine boride and the metal phase are folded in layers and crystallized in a lamellar shape and the other in which the boride is coarse. The average particle size of the fine boride is 12 μm or less. The maximum particle size of the coarse boride is 70 μm or less. The coarse boride is likely to be the starting point of fracture and crystallization to a fine size is required.

Hereinafter, the present invention will be specifically described with reference to Examples and Comparative Examples.

EXAMPLES

Experiment 1

[Alloy Ingot Fabrication]

An alloy ingot was fabricated by a casting method in order to confirm the appropriate amounts and ratio of the chemical components of the Ni—Cr—Mo-based alloy according to the present invention. It can be said that the alloy ingot fabricated by the casting method pseudo-reproduces the solidification structure of the Ni—Cr—Mo-based alloy member according to the present invention and the Ni—Cr—Mo-based alloy powder according to the present invention in a cast state.

First, the following five types of raw material powders were prepared and weighing was performed so as to reach the alloy compositions of Examples 1 to 7 and the alloy compositions of Comparative Examples 1 and 2 in Table 1 (unit: % by mass).

Ni: spherical particles with a particle size of 8 mm to 15 mm,

Cr: powder with a particle size of 63 μm to 90 μm,

Mo: fine powder with an average particle size of approximately 1.5 μm,

Ta: powder with a particle size of 45 μm or less,

MoB: fine powder with a particle size of 3 μm to 6 μm

TABLE 1

| | % by mass | | | | Mass ratio |
|---|---|---|---|---|---|
| | Ni | Cr | Mo | Ta | B | Cr + Mo/2B |
| Comparative Example 1 | 59.7 | 19 | 19 | 1.8 | 0.5 | 38 |
| Comparative Example 2 | 58.2 | 19 | 19 | 1.8 | 2 | 23.8 |
| Example 1 | 59.2 | 19 | 19 | 1.8 | 1 | 28.5 |
| Example 2 | 58.7 | 19 | 19 | 1.8 | 1.5 | 25.3 |
| Example 3 | 45.4 | 19 | 32.3 | 1.8 | 1.5 | 29.8 |
| Example 4 | 52.2 | 19 | 25 | 1.8 | 2 | 25.3 |
| Example 5 | 48.2 | 19 | 29 | 1.8 | 2 | 26.3 |
| Example 6 | 44.2 | 19 | 33 | 1.8 | 2 | 27.3 |
| Example 7 | 40.5 | 19 | 36.7 | 1.8 | 2 | 28.2 |

Next, these raw material powders were placed in an alumina crucible and mixed. After melting this mixed powder in a high-frequency induction melting furnace, the melted mixed powder was poured into a water-cooled copper mold to obtain an alloy ingot (ingot). A test piece having a predetermined shape was fabricated from the ingot of each test material melted so as to have the chemical composition in Table 1, and the following hardness measurement (wear resistance evaluation) and corrosion resistance evaluation were performed.

(Hardness Measurement)

The post-cutting cross section of each test piece was polished to a mirror surface using emery paper and diamond abrasive grains. Then, the Vickers hardness was measured using a Vickers hardness tester at room temperature, at a load of 500 gf, and for a retention time of 15 seconds. The measurement was performed 5 times, and the average value of the 5 measurements was recorded. The obtained Vickers hardness (HV) was converted into Rockwell hardness (HRC). It should be noted that American Society for Testing and Materials (ASTM) E140 Table 2 was referred to for the conversion. A Rockwell hardness of HRC 40 or more was evaluated as excellent "o", and a Rockwell hardness of less than 40 HRC was evaluated as defective "x". Table 2 shows the measured values and evaluation results.

(Corrosion Resistance Test)

Each test piece was cut to 10 mm×10 mm×2.5 mm, the entire surface of the test piece was polished to water-resistant emery paper #1,000, and then degreasing with acetone and ethanol was performed for a corrosion test. The dimensions and mass of each test piece were measured before the start of the corrosion test. Then, each test piece was immersed for 10 hours in 10% $H_2SO_4$ kept at 40° C. Then, the test pieces were taken out of the corrosive liquid, the mass of each test piece was measured, and the rate of corrosion was obtained from the mass change. In addition, the form of corrosion of the appearance of the test piece was observed with a scanning electron microscope (SEM).

The corrosion rate was calculated by the following Equation (1).

$$s=(g_0-g_a)/(A\times t) \quad (1)$$

Here, s is the corrosion rate [$g \cdot m^{-2} \cdot h^{-1}$], $g_0$ is the mass [g] of the test piece before the immersion in the corrosive liquid, $g_a$ is the mass [g] of the test piece after the immersion in the corrosive liquid, A is the surface area [$m^2$] of the sample, and t is the immersion time [h] in the corrosive liquid.

The corrosion test was performed three times for each test material. The result with the highest corrosion rate was taken as the representative value of the corrosion rate of the test material. A corrosion rate of 0.1 $g \cdot m^{-2} \cdot h^{-1}$ or less was evaluated as excellent "o", and a corrosion rate of higher than 0.1 $g \cdot m^{-2} \cdot h^{-1}$ was evaluated as defective "x". Table 2 shows the measured values and evaluation results.

TABLE 2

| | Hardness | | Corrosion resistance | |
|---|---|---|---|---|
| | Measured value [HRC] | Pass or fail | Measured value [$g/m^2/h$] | Pass or fail |
| Comparative Example 1 | 33.4 | x | 0.003 | o |
| Comparative Example 2 | 54.6 | o | 0.24 | x |
| Example 1 | 42.8 | o | 0.013 | o |
| Example 2 | 49.4 | o | 0.055 | o |
| Example 3 | 54.4 | o | 0.016 | o |
| Example 4 | 48.8 | o | 0.010 | o |
| Example 5 | 49.4 | o | 0.010 | o |
| Example 6 | 53.8 | o | 0.015 | o |
| Example 7 | 57.7 | o | 0.023 | o |

As shown in Table 2, the test pieces having the alloy compositions of Examples 1 to 7 were excellent in both hardness evaluation and corrosion resistance evaluation. Meanwhile, the test piece having the alloy composition of Comparative Example 1 had a hardness of less than 40 HRC owing to the small amount of B. Although the test piece having the alloy composition of Comparative Example 2 satisfies the component amount of each element, Cr+(Mo/2B) is less than 25. Accordingly, the corrosion resistance was low and the corrosion rate was higher than 0.1 $g \cdot m^{-2} \cdot h^{-1}$.

[Structure Observation]

Pre- and post-corrosion test backscattered electron images (BEIs) and composition mappings were observed. FIG. 2A is the pre-corrosion observation image of the test piece having the alloy composition of Example 7, and FIG. 2B is the post-corrosion observation image of the test piece having the alloy composition of Example 7. FIG. 3A is the pre-corrosion observation image of the test piece having the alloy composition of Comparative Example 2, and FIG. 3B is the post-corrosion observation image of the test piece having the alloy composition of Comparative Example 2. The magnification of the backscattered electron image is 300 times.

As illustrated in FIG. 2A, it was confirmed that the structure of the Ni—Cr—Mo-based alloy member of the present invention consists of a parent phase 5 (part that looks blackish) and a boride 6 with concentrated Mo (part that looks whitish).

In addition, it was confirmed from FIG. 2B that the Ni—Cr—Mo-based alloy member of the present invention was uniformly corroded without local corrosion traces being confirmed.

In the test piece having the alloy composition of Comparative Example 2, Mo was strongly concentrated in a boride illustrated in FIG. 3A. In addition, in FIG. 3A, a Mo-deficient phase 8 (region surrounded by a dotted line) with an extremely small amount of Mo was confirmed. In FIG. 3B, a local corrosion site 9 was confirmed. With the post-corrosion composition mapping of the structure in FIG. 3B confirmed, a structure corresponding to the Mo-deficient phase 8 was not confirmed, and thus it is conceivable that what was locally corroded is the Mo-deficient phase 8 observed before the corrosion. The Mo-deficient phase 8 is formed by the elemental distribution during the melting and solidification, has a structure characteristic of an alloy fabricated by melting and solidification, and is not found in an alloy fabricated by a sintering method. In this regard, in the present invention, Mo-deficient phase generation is suppressed by balancing the component ratios of Cr and Mo with respect to B.

In other words, in the alloy composition of Comparative Example 2, the value of Cr+(Mo/2B) is 23.8 and the component ratio balance is lost. Since the amount of Mo with respect to B is small, the Mo-deficient phase 8 is generated to a large extent and, as a result, it can be said that sufficient corrosion resistance could not be obtained. On the other hand, in the alloy composition of Example 7, the value of Cr+(Mo/2B) is 28.2 and the amount of Mo with respect to B is balanced, and thus it can be said that the generation of the Mo-deficient phase 8 was suppressed and the corrosion resistance was excellent.

[Melting and Solidification Structure]

Further details were investigated as to the melting and solidification structure. Illustrated in FIG. 4 is a backscattered electron image (BEI) of the test piece having the alloy composition of Example 6. The magnification is 500 times. A dendrite structure 10 composed of an FCC phase was confirmed as illustrated in FIG. 4. This is a structure formed in the case of manufacturing by a manufacturing method involving melting and solidification, such as an alloy ingot by a casting method and a additively manufactured product by an additive manufacturing method, and is a structure not found by a sintering or HIP method.

Two forms of boride were confirmed by observing FIG. 4, one being an ingot-shaped boride 11 of 5 to 100 μm and the other being a lamellar boride 12 with a width of 1 to 3 μm. In addition, the amount of Mo addition exceeds 30% by mass in the alloy composition of Example 6. As for the alloy with a relatively large amount of Mo, a third phase 13, which is neither an FCC phase nor a boride, was also confirmed although the detailed composition is yet to be clarified. With this third phase component-analyzed by EDX, it was found that Cr is 22.2%, Ni is 39.8%, Mo is 35.4%, and Ta is 0.6% in terms of atomic number concentration. This is close to the component ratio of the P phase ($Mo_3$ $(Mo,Cr)_5Ni_6$) to be described later, and thus it is conceivable that the third phase is likely to be the P phase.

Experiment 2

[Fabrication of Additively Manufactured Product]

Next, an additively manufactured product was fabricated by the additive manufacturing method and an experiment was conducted. First, Ni—Cr—Mo-based alloy powders were fabricated by gas atomization method from the mixed powders having the alloy compositions of Example 4 and Example 6 prepared in Experiment 1. The particle sizes $d_{50}$ of the powders were 96.7 μm (Example 4) and 104.1 μm (Example 6).

The composite member 4 illustrated in FIG. 1 was fabricated by the LMD method. As for the base material 1, a Ni-based alloy (Alloy 718) was prepared and 46 layers (approximately 10 mm to 20 mm in height) were used as the alloy layer (lamination building portion) 2 under the following laminating conditions using a laminating building device (LASERTEC 65 3D manufactured by DMG Mori Seiki Co., Ltd.).

Scanning rate: 1,000 ram/min,
Powder supply amount: 14.0 g/min,
Fiber laser output: 2 conditions of 1 kW and 2 kW.
Melting and solidification were performed normally, and a additively manufactured product without defects such as cracks could be fabricated.

[Observation of Structure of Additively Manufactured Product]

Illustrated in FIG. 5 are backscattered electron images (BEIs) of alloy ingots fabricated with the alloy compositions of Examples 4 and 6 in Experiment 1 and the additively manufactured product fabricated as described above. The magnification is 300 times each, what looks black is the parent phase, and what looks white is the boride. In FIG. 5, it can be seen that an ingot-shaped boride is scattered in the case of the alloy ingot whereas a granular boride is dispersed and precipitated almost uniformly in the case of the additively manufactured product. It is conceivable that this is because the size and state of dispersion of the boride depend on the rate of cooling from the liquid phase and the additive manufacturing method is faster in cooling rate than the casting method.

In addition, it can be seen that fine borides are uniformly dispersed more in the additively manufactured product with a laser output of 1 kW than in the additively manufactured product with a laser output of 2 kW even in the atomized powder of the same composition. When the output is small, the maximum arrival temperature reached of the molten pool is low and the amount of heat input to the base material is small. Accordingly, it is conceivable that the heat drawing of the building portion is fast and the rate to solidification is fast. Accordingly, it is presumed that the boride is unlikely to coarsen and finely dispersed when the output is small. In general, wear resistance is higher when hard particles are small and dispersed with uniformity than when hard particles are large and dispersed without uniformity. Accordingly, it is conceivable that the additively manufactured product manufactured at an output of 1 kW has the highest wear resistance.

Next, the average and maximum values of the particle size converted into the equivalent circle diameter of the boride were calculated by image analysis. In addition, the hardness was measured as in Experiment 1. Further, the presence or absence of cracks was confirmed by visual observation. The results are shown in Table 3.

TABLE 3

| Raw material powder | Analysis target | Boride particle size μm | | Hardness HRC | Crack |
|---|---|---|---|---|---|
| Example 4 | Alloy ingot | Average value | 13.4 | 48.8 | Present |
| | | Maximum value | 75.5 | | |
| | additively manufactured product (output: 1 kW) | Average value | 7.6 | 49.1 | Absent |
| | | Maximum value | 15.8 | | |
| | additively manufactured product (output: 2 kW) | Average value | 10.6 | 47.4 | Absent |
| | | Maximum value | 25 | | |
| Example 6 | Alloy ingot | Average value | 12.5 | 53.8 | Present |
| | | Maximum value | 107 | | |
| | additively manufactured product (output: 1 kW) | Average value | 8.2 | 50.4 | Absent |
| | | Maximum value | 20 | | |
| | additively manufactured product (output: 2 kW) | Average value | 11.6 | 49.7 | Absent |
| | | Maximum value | 48.5 | | |

From Table 3, the average value of the particle size of the boride particles may be 12 μm or less, is preferably 10 μm or less, and is more preferably 8 μm or less. The maximum value of the particle size of the boride particles may be 70 μm or less, is preferably 50 μm or less, and is more preferably 20 μm or less.

The relationship between the maximum value of the particle size of the boride particles and crack resistance will be described below. An indentation fracture (IF) method is a method for easily estimating a fracture toughness value. By the IF method, the fracture toughness value is calculated from the lengths of an indentation and a crack resulting from Vickers indenter press-fitting into a mirror-polished test piece. As a result of an IF method-based Vickers test, cracks were found in the coarse boride around the Vickers indentation in the materials in which a boride larger than 70 μm was found (alloy ingots having the alloy compositions of Examples 4 and 6). On the other hand, no cracks were found in the material containing a boride of 70 μm or less. From this, it is conceivable that having a boride of 70 μm or less is effective for crack resistance improvement.

Further, from Table 3, the additively manufactured product was slightly inferior in hardness to the alloy ingot in some cases and yet no significant difference was confirmed. Accordingly, it is conceivable that a additively manufactured product in which the boride is dispersed more finely, a 1 kW building material with a small output and a finer boride in particular, is excellent in wear resistance.

How to calculate the average and maximum values of the boride particle size will be described below. First, secondary electron images of respective samples captured at a magnification of 300 times are binarized by image processing for boride and non-boride separation. Subsequently performed are erosion for pixel exclusion from the boundary portion of the boride and dilation for pixel addition around the boride. As a result, isolated pixels can be excluded. Subsequently, outlier removal is performed. The outlier removal, which enables boride separation, is to replace the value of a pixel with a median value when the difference between the pixel value and the median value around the pixel value is equal to or greater than a certain value. At this time, the range of the region for calculating the median value was 5 pixels. Then, the equivalent circle diameter of the separated boride was calculated and the average and maximum values of the boride were calculated from the equivalent circle diameter. The average and maximum values of the boride were calculated three times each per sample, and the average value of the three calculations was used as a representative value. In order to remove the noise that could not be completely removed, small particles with a particle size of less than 6 μm were not counted and only borides with a particle size of 6 μm or more were counted.

[Component Analysis]

Next, the components of the parent phases (FCC) of the alloy ingot and the additively manufactured product were analyzed by EDX. The results are shown in Table 4.

TABLE 4

| Raw material powder | Analysis target | % by mass | | | |
|---|---|---|---|---|---|
| | | Ni | Cr | Mo | Ta |
| Comparative Example 2 | Alloy ingot | 79.80 | 11.95 | 4.14 | 4.11 |
| Example 4 | Alloy ingot | 63.37 | 18.60 | 16.64 | 1.39 |
| | additively manufactured product (output: 1 kW) | 61.83 | 18.75 | 17.82 | 1.60 |
| | additively manufactured product (output: 2 kW) | 62.54 | 18.37 | 17.88 | 1.21 |
| Example 6 | Alloy ingot | 57.17 | 19.10 | 22.17 | 1.56 |
| | additively manufactured product (output: 1 kW) | 55.01 | 18.92 | 24.42 | 1.65 |
| | additively manufactured product (output: 2 kW) | 56.96 | 18.57 | 24.05 | 0.42 |

From Table 4, in the alloy ingot having the alloy composition of Comparative Example 2, the amount of B addition is large, a large amount of Mo is concentrated in the boride and, as a result, the amount of Mo in the parent phase is drastically reduced. On the other hand, although the amount of Mo in the parent phase is reduced from the amount of added Mo as a result of boride precipitation in the alloy compositions of Examples 4 and 6, the amount of Mo in the alloy composition of Example 4 is 16 to 18% by mass, the amount of Mo in the alloy composition of Example 6 is 22 to 25% by mass, and it can be seen that the parent phase contains a sufficient amount of Mo as compared with the alloy composition of Comparative Example 2. In addition, in both the alloy compositions of Examples 4 and 6, it can be seen that the amount of Mo is larger in the additively manufactured product than in the alloy ingot. It is conceivable that this is because the additive manufacturing method is higher in cooling rate with concentration distribution attributable to solidification suppressed. Accordingly, the amount of Mo in the parent phase is preferably 5% by mass or more and more preferably 10% by mass or more.

[Crystal Structure Analysis]

Crystal structure analysis was performed on the alloy ingot and the additively manufactured product by X-ray diffraction (XRD). The result of the alloy composition of Example 4 is illustrated in FIG. 6, and the result of the alloy composition of Example 6 is illustrated in FIG. 7. It should be noted that the radiation source was Cu, the tube voltage was 48 kV, the tube current was 28 mA, the sampling interval was 0.02°, and the scanning range was 2θ from 20 to 100°. As the sample used for the measurement, the sample was cut out from each ingot and then polished to water-resistant emery paper #1,000 was used.

As a result of the XRD measurement, it was found that the alloy ingot and the additively manufactured product are not different from each other in terms of constituent phase and each of the test pieces having the alloy compositions of Example 4 and Example 6 has a structure mainly composed of FCC and $M_3B_2$ boride (tetragonal). In the alloy composition of Example 6, a peak of the third phase is confirmed in addition to the FCC and the boride, a pattern close to the P phase ($Mo_3(Mo,Cr)_5Ni_6$) as an orthorhombic intermetallic compound is shown, and yet no complete identification is made. Although the P phase is a brittle intermetallic compound in general, it is conceivable that the peak intensity is sufficiently small, the volume fraction with respect to the entire structure is estimated to be small, and thus the toughness is not significantly affected.

(Wear Test)

Next, a high-temperature wear test was performed on the test piece of the alloy ingot having the alloy composition of Example 6. FIG. 8 is a graph illustrating the result of the high-temperature wear test. For comparison, the same tests were performed on hot mold steel (Japanese Industrial Standards (JIS) SKD61, SKD61+nitriding, YXR33, and injection molding screw steel (YPT71)). "YXR" and "YPT" are registered trademarks of Hitachi Metals, Ltd. The nitriding treatment was performed using plasma nitriding, and nitrogen diffused to a depth of 100 μm from the outermost surface was used for the test.

The test conditions are as follows, and the test piece is pressed against the outer periphery of a cylindrical workpiece that rotates while being eccentric. The number of times of sliding on the horizontal axis in FIG. 8 corresponds to the number of rotations of the workpiece. The vertical axis indicates the depth of test piece wear attributable to contact with the workpiece. The maximum value of the depth was evaluated.

Test conditions: workpiece temperature: 900° C., test piece temperature: approximately 25 to 100° C.

Workpiece outer periphery speed: 30 m/min, vertical load: 250 N

As illustrated in FIG. 8, the test piece of the alloy ingot having the alloy composition of Example 6 is remarkably higher in wear resistance than the hot mold steel (SKD61, SKD61+nitriding, and YXR33) and is equal in wear resistance to the injection molding screw steel (YPT71). The same results were confirmed as to the test piece of the additively manufactured product.

As described above, according to the present invention, it is possible to provide a Ni—Cr—Mo-based alloy member, a Ni—Cr—Mo-based alloy powder, and a composite member that can be melted and solidified and are excellent in corrosion resistance and wear resistance.

It should be noted that the present invention is not limited to the examples described above and includes various modification examples. For example, the above examples have been described in detail so that the understanding of the present invention is facilitated and the present invention is not necessarily limited to what includes every configuration described above. In addition, a part of the configuration of one example can be replaced with the configuration of another example and the configuration of another example can be added to the configuration of one example. In addition, the configurations of the examples can be partially added, deleted, and replaced in relation to other configurations.

REFERENCE SIGNS LIST

1: base material
2: alloy layer (an additively manufactured portion)
3: mixed layer
4: composite member (Ni—Cr—Mo-based alloy member)
5: parent phase
6, 7: boride
8: Mo-deficient phase
9: corrosion site
10: dendrite structure
11: ingot-shaped boride
12: lamellar boride
13: third phase

The invention claimed is:

1. A Ni—Cr—Mo-based alloy member which is an additively manufactured product, comprising, by mass %:
   Cr: 18% to 22%;
   Mo: 18% to 39%;
   Ta: 1.5% to 2.5%;
   B: 1.0% to 2.5%; and
   a remainder consisting of Ni and unavoidable impurities, where $25 \leq Cr+(Mo/2B)<38$ is satisfied,
   wherein boride particles with a maximum particle size of 70 μm or less are dispersed and precipitated in a parent phase.

2. The Ni—Cr—Mo-based alloy member according to claim 1, having a dendrite structure in the parent phase.

3. The Ni—Cr—Mo-based alloy member according to claim 1, wherein the boride particles have an average particle size of 12 μm or less.

4. The Ni—Cr—Mo-based alloy member according to claim 1,
   wherein the amount of Mo contained in the parent phase is 5% by mass or more.

5. A composite member
   wherein a base material and a layer of the Ni—Cr—Mo-based alloy member according to claim 1 are laminated on a surface of the base material.

6. The composite member according to claim 5, being a screw or a cylinder for injection molding.

7. A composite member comprising a Ni—Cr—Mo-based alloy member according to claim 1.

8. The Ni—Cr—Mo-based alloy member according to claim 1,
   wherein the boride particles with an average particle size of 12 μm or less are precipitated in a form in that the boride particles and a metal phase having an FCC structure are folded in layers and crystallized in a lamellar shape.

9. A Ni—Cr—Mo-based alloy powder being used for additively manufacturing, comprising, by mass %:
   Cr: 18% to 22%;
   Mo: 18% to 39%;
   Ta: 1.5% to 2.5%;
   B: 1.0% to 2.5%; and
   a remainder consisting of Ni and unavoidable impurities, where $Cr+ (Mo/2B) \geq 25$ is satisfied.

10. The Ni—Cr—Mo-based alloy powder according to claim 9,
    wherein $d_{50}$, which is a particle size at a time when an integrated value by laser diffraction-type particle size distribution measurement is 50% by volume, is 10 to 60 μm.

11. The Ni—Cr—Mo-based alloy powder according to claim 9,
    wherein $d_{50}$, which is a particle size at a time when an integrated value by laser diffraction-type particle size distribution measurement is 50% by volume, is 30 to 250 μm.

12. A composite member comprising a Ni—Cr—Mo-based alloy powder according to claim 9.

* * * * *